Figure 1:
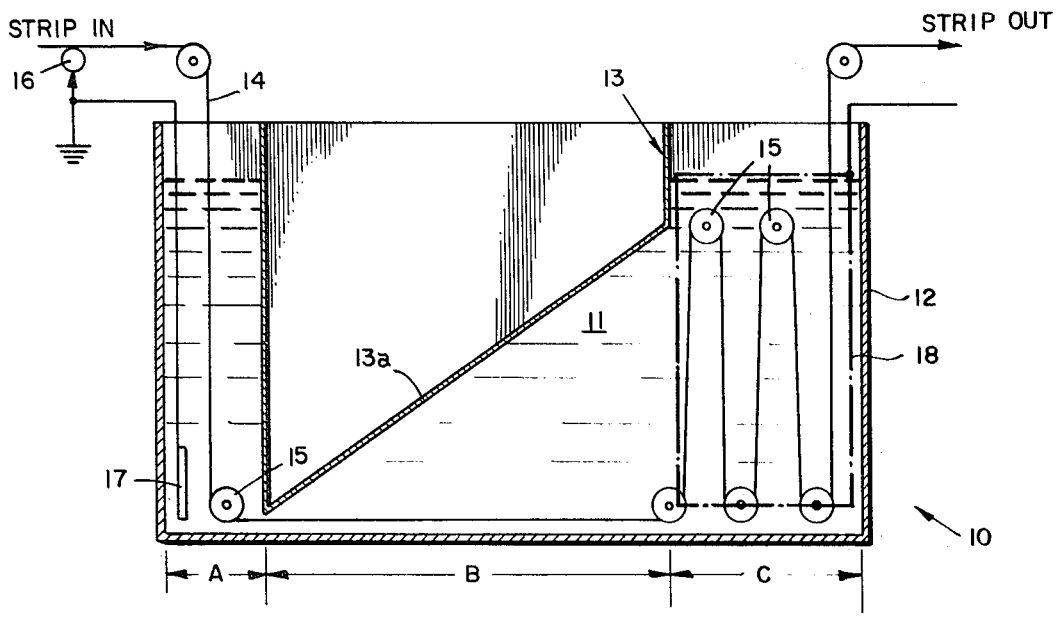

United States Patent

[11] 3,616,425

| [72] | Inventors | Gerhart P. Klein<br>Manchester;<br>Milton Kallianides, Brockton, both of Mass. |
|---|---|---|
| [21] | Appl. No. | 880,487 |
| [22] | Filed | Dec. 10, 1969 |
| [45] | Patented | Oct. 26, 1971 |
| [73] | Assignee | P. R. Mallory & Co., Inc.<br>Indianapolis, Ind.<br>Continuation of application Ser. No.<br>670,723, Sept. 26, 1967, now abandoned. |

[54] APPARATUS FOR CONTINUOUS FORMING OF ANODES FOR CAPACITORS
5 Claims, 4 Drawing Figs.

[52] U.S. Cl. .................................................. 204/206
[51] Int. Cl. .................................................. C23b 5/68
[50] Field of Search .................................. 204/206–211, 28

[56] References Cited
UNITED STATES PATENTS

| 2,019,994 | 11/1935 | Rhodes | 204/211 X |
| 2,494,954 | 1/1950 | Mason et al. | 204/206 |
| 2,538,317 | 1/1951 | Mason et al. | 204/28 |
| 2,541,275 | 2/1951 | Odier | 204/211 |
| 2,828,250 | 3/1958 | Hurd | 204/211 X |
| 2,951,025 | 8/1960 | Mustovych et al. | 204/211 |
| 3,074,857 | 1/1963 | Altenpoll | 204/28 |
| 3,079,308 | 2/1963 | Ramirez et al. | 204/28 |

*Primary Examiner*—Howard S. Williams
*Assistant Examiner*—W. I. Solomon
*Attorneys*—Richard H. Childress and Robert F. Myer

ABSTRACT: A tank for an electrolyte is functionally divided into three sections for the continuous generation of anodic oxide on an endless moving strip passing through the tank.

PATENTED OCT 26 1971 3,616,425

SHEET 1 OF 2

INVENTORS
GERHART P. KLEIN
MILTON KALLIANIDES
BY Robert Levine
ATTORNEY

INVENTORS
GERHART P. KLEIN
MILTON KALLIANIDES ns.
3,616,425

APPARATUS FOR CONTINUOUS FORMING OF ANODES FOR CAPACITORS zThis is a continuation of application Ser. No. 607,723 filed Sept. 26, 1967, and now abandoned.

Solid electrolytic capacitors are being employed instead of commonly used aluminum capacitors for many applications for many reasons. One is the size advantage. Units having a given capacitance rating can be manufactured so as to be smaller than aluminum electrolytic capacitors having the same rating.

Generally, solid electrolyte capacitors are fabricated by pressing and sintering a film-forming metal such as tantalum, aluminum, niobium, titanium, zirconium, hafnium, and the like into a pellet having a multiplicity of intercommunicating voids. During the fabrication thereof, the pellet is subjected to anodization electroformation by passing a direct current from the pellet through an electrolyte in which the pellet is immersed, to a vessel containing the electrolyte. The voltage applied to the anode ranges from about 10–500 volts depending on the thickness of the anodized film desired. The higher the voltage that is used, the thicker the resulting film and the lower the resulting capacitance. The electrolyte solution may be an aqueous solution of sulfuric and phosphoric acid, and the like. The pellet is impregnated with a solution of a material convertible to a semiconductive oxide such as manganous nitrate, and heated in air at a sufficient temperature of about 200° to 400° C. to effect the pyrolytic conversion of the manganous nitrate covering the pellet and permeating the pores to a semiconductive manganese dioxide. The anodization step and the pyrolytic conversion step may be repeated as many times as is necessary in order to obtain a pellet having the desired electrical characteristics. The manganese dioxide layer acts as the cathode contact for the capacitor. The cathode is completed using conventional methods whereby an electrically conductive layer is applied over the manganese dioxide layer. Preferably, a graphite layer is applied to the manganese dioxide before the remaining layers are applied. The capacitor is completed by attaching leads to the anode and to the cathode and encapsulating the capacitor.

The present invention is concerned with the anodization step. More particularly, the invention is concerned with method and apparatus for the continuous generation of an anodic oxide on a moving carrier strip of foil or wire. The concept of the invention is particularly adaptable to the anodization of pressed and sintered porous tantalum pellets and the tantalum foil which carries them, although the invention extends beyond this configuration to include the anodization of strips of tantalum without the pellets, or to any of the strip materials previously noted.

A continuous manufacturing process wherein pellets are carried by an endless carrier strip requires a continuous forming process with control over the rate of formation of anodic oxide films. In the case of reformation, after the application of manganese dioxide, the voltage has to be increased at a predetermined rate. In the latter case, a small amount of current is drawn by the moving strip as compared with the high current densities required for formation.

The invention describes forming tanks for both the anodic oxidation of bare metal and the reformation of previously generated oxide of the metal (tantalum) in between manganese dioxide deposition cycles and at the end of the deposition of manganese dioxide.

An object of the invention is to provide a method and apparatus for the continuous anodization of a strip of foil or wire with or without having sintered pellets attached thereto.

Another object of the invention is to provide a tank for the electrolyte through which the foil passes.

Another object of the invention is to provide a tank functionally having an entrance-formation section, and an ageing section.

Another object of the invention is to provide a tank functionally having an entrance section, a forming section, and an ageing section.

Still another object of the invention is the provision of a tank having baffle means to provide for the sections.

Yet another object of the invention is to provide a tank having a contoured bottom forming the sections.

Another object of the invention is to provide a means within the entrance section for preventing a current surge when the strip enters the tank. Such current surge may cause damaged oxide films on the strip surface.

Yet another object of the invention is to provide a tank wherein the rate at which the anodic oxide film is generated on the moving strip in the forming section of the tank is constant. With the rate being constant, the growth rate of the anodic oxide is predictable and uniform.

Another object of the invention is to provide a tank wherein the baffle means or the tank bottom forms a geometry which is particularly adaptable to formation of the anodic oxide film on bare metal.

An additional object of the invention is to provide a tank wherein the baffle means or the tank bottom forms a geometry which is particularly adaptable to reforming the anodic-oxide film to repair any damage that may have occurred to the formed film.

Figure 2:
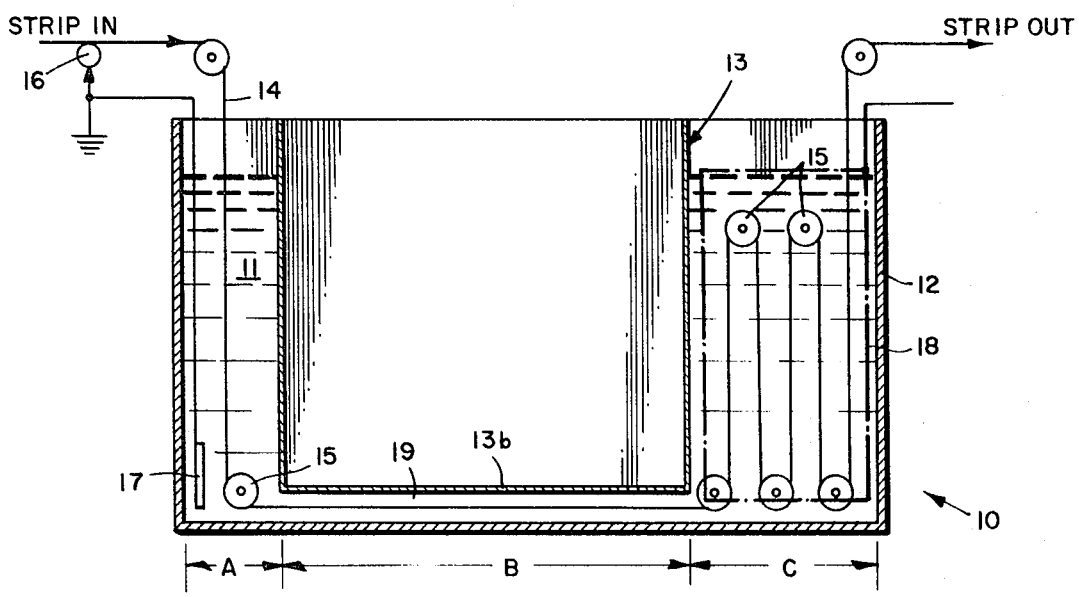
Figure 3:
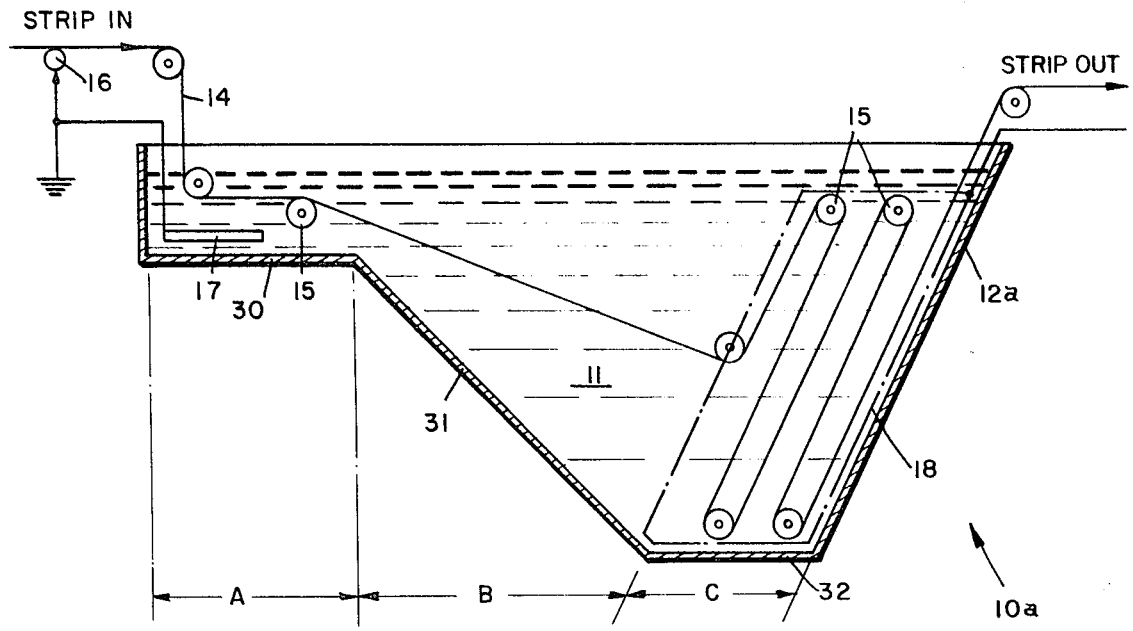
Figure 4:
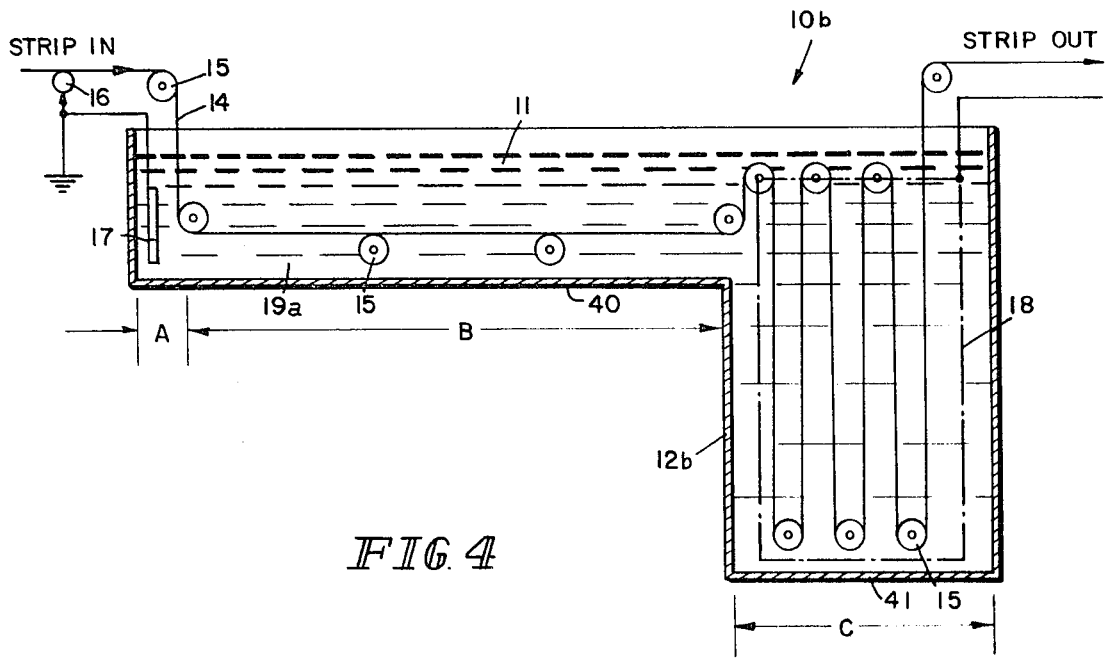

With the above and other objects in view, which will appear as the description proceeds, this invention resides in a novel method and apparatus for continuously anodizing strips or strips carrying sintered anodes substantially as described herein and more particularly defined by the appended claims, it being understood that such changes in the precise embodiment of the invention here disclosed may be made as come within the scope of the claims. In the drawings:

FIGS. 1 and 2 are cross sections of an electrolytic tank schematically showing a baffle means for functionally dividing the tank; and FIGS. 3 and 4 are cross sections of such a tank schematically showing the functional division of the tank formed by the tank's configuration.

Generally speaking, the objects of the invention are accomplished by providing a tank for holding an electrolyte through which a metal strip such as tantalum is passed to anodize the strip. Means are provided to functionally divide the tank into at least two sections: an entrance and a formation section, and an ageing section. The formation section gives a constant formation rate by the arrangement of the means forming the sections. Means are provided in the entrance section to prevent the oxide formation until the strip reaches the formation section thus avoiding a current surge.

In one embodiment of the invention, the means dividing the tank into its functional sections comprises, in general, the contour or the configuration of the bottom of the tank. In another embodiment baffle means are disposed within the tank.

Referring now to FIG. 1, there is shown an electrolytic bath 10 wherein an electrolyte 11 is contained in an open top tank 12. A suitable electrolyte would be an aqueous solution of sulfuric or phosphoric acid, and the like. The tank needs to be constructed from electrically insulating materials, such as Teflon polypropylene, and others, or if it is made from stainless steel, it has to be provided with an insulating liner both on the inside and the outside. The outer insulating coating is required for safety reasons since the tank cannot be grounded and will carry a potential equal to the formation voltage (up to 500 v.). The tank is functionally divided into three sections: a strip entrance section A, a forming section B and an ageing section C, the sections being formed by baffle means 13. The strip 14 that is fed through the tank is, as shown, at ground potential when it enters the tank. The strip is guided through the tank by suitable pulleys 15. Electrical contact from a power supply (not shown) is provided by suitable rollers or brushes 16. As shown in the drawings, there are no sintered powder pellets attached to and carried by the strip. However, as previously noted, it is within the scope of the invention to have the strip carry the sintered pellets, with the pellets being anodized along with the strip, as the strip passes through the electrolyte.

An active auxiliary electrode 17 is disposed within the entrance section A, the electrode being at ground potential. The electrode is constructed of a material such as a 1-square-inch piece of platinum foil. This auxiliary electrode serves the purpose of preventing formation of oxide on the strip before the strip enters the formation section B. It will carry current only in cases where the resistivity of the electrolyte is not properly matched with the speed of the strip and the specific forming charge thus preventing a current surge. A counter electrode (cathode) 18 is disposed within the ageing section C. Electrode 18 could be constructed of stainless steel, for example. It substantially surrounds the whole of the ageing section so that the potential in the ageing section is constant.

The rate of formation of anodic oxide films is directly proportional to the current density at the surface of the strip. In the case of a constant rate of formation, the current density over the full length of the strip in the forming section is constant. Thus, for a tank of a given width, and for an electrolyte of a given conductivity, the height of the forming section, or the depth of the electrolyte, has to increase linearly from the beginning of the forming section to its end, for a constant rate of formation. As shown, the increasing depth is accomplished by surface 13a of baffle means 13. The geometry of the baffle means 13, once fixed, is not readily changed. Thus, in order to be able to process strips of different forming voltage at different rates of formation, one can adjust the conductivity of the electrolyte. Alternatively, baffle means 13 can be made readily adjustable. Likewise, where necessary, forming rates other than linear can be derived by providing a nonlinear rise in surface 13a.

A plurality of pulleys 15 are provided in ageing section C in order to more readily increase the length of strip being aged.

The length of the forming section B and the number of passes in the ageing section C depend on the speed of the strip 14, the forming rate, and the ageing time. Typical forming rates for tantalum anodes —with tantalum pellets carried by the strip —would be in the range of 5–20 volts per minute. In a typical example, the forming rate would be 10 volts/min., the speed of the strip 7.5 cm/min., the target voltage 150 volts, and the ageing time 1 hour. This requires section B to be 112.5 cm. long, and 450 cm. of strip to be aged in section C. The resistivity of the electrolyte would be 150 ohm-cm., and the slope of the baffle surface 13a would be about 1 to 1.

FIG. 2 illustrates the tank with the baffle means 13 being arranged for reforming. In the case of the reformation of tantalum oxide following pyrolysis, the oxide film is already there, but it may have become damaged in places and thus requires careful reapplication of voltage in order for the damage to repair itself. The application of voltage should be programmed in such a way as to prevent additional damage through sudden application of full voltage. There should preferably be a linear increase of voltage with time. The amount of voltage required is substantially less than in the formation of a bare strip.

Again the tank comprises three sections: an entrance section A, a reformation section B, and an ageing section C, the sections being formed by baffle means 13. The strip 14 entering the tank is grounded as before. Constant voltage is applied between the counter electrode (cathode) 18 and the auxiliary electrode 17. Sections A and C are connected by a channel 19 formed by baffle surface 13b and the bottom of the tank. The electrical resistance of the channel X—that is, the reforming section of the tank—is constant. A constant current flows, thus setting up a constant potential gradient across the length of the channel. The resistivity of the electrolyte for reformation is in the kilo-ohm range, the cross section of the channel of the order of 1 cm.$^2$, the length on the order of 100 cm., and the current flowing through the channel is of the order of 1 ma. The currents required for reformation are usually of the order of microamperes and, therefore, small compared to the current flowing in the channel. This arrangement is equivalent to a potentiometric set up in which the strip consumes the charge required to lift it to the needed potential without significantly affecting the channel current.

The auxiliary electrode in section A now plays an essential role in that it defines the point at which the potential starts to rise. If the channel can be compared with the slide wire of a voltage divider, then an increment of the strip (e.g. 1 cm.) can be compared to the sliding contact on the slide wire and the process of reformation with the movement of the strip increment from one end of the channel (slide wire) to the other. The rate at which the strip increment travels from one end to the other determines the rate of reformation. Ageing of the strip after reformation is done in an analogy after forming.

Referring now to FIGS. 3 and 4, there is shown alternate baths 10a and 10b for a different form of the invention. In the embodiments of this form of the invention, the means to functionally divide the tanks 12a and 12b into the aforementioned sections comprises the contour or configuration of the bottoms of the tanks. The tank shown in FIG. 3 is for the anodic formation of bare metal, and as such it is similar to the tank of FIG. 1. As shown, the bottom of the tank has a first horizontal portion 30, a sloping portion 31 and a second horizontal portion 32, the sloping portion 31 yielding an increasing depth of the electrolyte 11 for the formation section B. It is also noted that the strip 14 is being fed through the formation at angle off the horizontal. The magnitude of such angle is dependent upon the slope of bottom portion 31 and the formation rate desired, the rate once determined being constant. As in the case of FIG. 1, the auxiliary electrode 17 prevents oxide formation on the strip until the strip enters formation section B.

FIG. 4 is comparable to FIG. 2; that is, the tank is designed for strip reformation. The bottom of the tank is now formed in two levels by horizontal portions 40 and 41. As in the case of FIG. 2, bottom portion 40 forms a channel 19a, the channel being used to reform the strip as is done in FIG. 2.

It is to be understood that the tank and the baffle means of FIG. 1 and 2 would be fabricated from an electrically insulating material, or at least the surfaces in contact with the electrolyte, including pulleys 15, need to be of an insulating material such as Teflon or other similar material. In addition, means for heating, thermostatic control of the temperature, circulation of the electrolyte and other equipment known by those skilled in the art need to be incorporated with the tank.

Thus there is described a novel method and apparatus for anodizing metal strip in a continuous manner, the novel features of which would be readily apparent to those skilled in the art. In addition, the present invention is not intended to be limited to the disclosure herein, and changes and modifications may be made in the disclosure by those skilled in the art without departing from the spirit and scope thereof. Such modifications and variations are to be considered within the purview and scope of this invention and the appended claims.

We claim:

1. A system for continuously anodizing anodes for capacitors comprising:
   a tank of insulating material for containing an electrolyte;
   baffle means to divide said tank into at least two sections, a strip formation section and an ageing section;
   means to pass a metal strip sequentially through at least said formation and ageing sections;
   means to electrically maintain said strip at ground potential;
   the distance between said baffle and said strip gradually increasing from strip inlet to strip outlet within said formation section; and
   cathode electrode means within said tank and surrounding said ageing section.

2. A system according to claim 1 in which said baffle means also divides said tank into three sections, said strip formation section, said ageing section, and an entrance section.

3. A system according to claim 2 in which an auxiliary electrode is disposed in said entrance section.

4. A system according to claim 1 in which the rate of increase of distance between said strip and said baffle is at least partly linear.

5. A system according to claim 4 in which the rate of increase is substantially entirely linear.

* * * * *